United States Patent
Togai et al.

(10) Patent No.: US 6,871,133 B2
(45) Date of Patent: Mar. 22, 2005

(54) OUTPUT POWER CONTROLLING APPARATUS AND METHOD FOR INTERNAL COMBUSTION ENGINE

(75) Inventors: Kazuhide Togai, Takatsuki (JP); Kyoung-gon Choi, Okazaki (JP); Tadashi Takeuchi, Kariya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/635,860

(22) Filed: Aug. 6, 2003

(65) Prior Publication Data

US 2004/0107034 A1 Jun. 3, 2004

(30) Foreign Application Priority Data

Aug. 6, 2002 (JP) ......................................... 2002-228839

(51) Int. Cl.$^7$ ............................................... F02D 41/04
(52) U.S. Cl. ....................... 701/104; 123/350; 123/361; 123/406.23; 701/111
(58) Field of Search ......................... 123/350, 352–355, 123/361, 399, 406.23, 102–104; 701/110, 102–104, 111; 180/54.1

(56) References Cited

U.S. PATENT DOCUMENTS

| | | | | |
|---|---|---|---|---|
| 4,766,967 A | * | 8/1988 | Slicker et al. | 180/54.1 |
| 6,678,605 B2 | * | 1/2004 | Kisaka et al. | 701/111 |

FOREIGN PATENT DOCUMENTS

| | | | |
|---|---|---|---|
| EP | 1 097 834 A2 | | 5/2001 |
| GB | 2262818 | * | 6/1993 |
| JP | 2001-132501 A | | 5/2001 |

* cited by examiner

Primary Examiner—Tony M. Argenbright
(74) Attorney, Agent, or Firm—Rossi, Kimms, & McDowel

(57) ABSTRACT

An output power controlling apparatus and a method for reducing vibration caused by accelerating or shifting gearing in a vehicle includes a vibration component prediction section/step for predicting a vibration component to be generated on the vehicle from the target torque correlation value using a predetermined prediction model, and a feedback correction section/step for feedback correcting the target torque correlation value based on the predicted vibration component to suppress vibration.

12 Claims, 12 Drawing Sheets

Outline of a simulation model

Determination of a target acceleration

Approximation of a high-order system to a secondary system

Vehicle body forward and backward vibration variation

TPS variation

Acceleration variation

Engine torque variation

◎K map 1: the gain k varies in response to the speed of the on-line model

◎ K map 2: K map 1 + presence of a dead zone $$Gp(s) = \frac{K\omega_p^2}{(s^2 + 2\zeta_s\omega_p s + \omega_p^2)}$$

$$W(s) = \frac{\omega_m^2(s^2 + 2\zeta_p\omega_p s + \omega_p^2)}{\omega_p^2(s^2 + 2\zeta_m\omega_m s + \omega_m^2)}$$

Vibration suppression
by a two-stage step instruction

OUTPUT POWER CONTROLLING APPARATUS AND METHOD FOR INTERNAL COMBUSTION ENGINE

BACKGROUND OF THE INVENTION

1) Field of the Invention

This invention relates to an output power controlling apparatus and method for an internal combustion engine for reducing a vibration (acceleration shock) upon pedaling of an accelerator pedal or a vibration (shift shock) upon speed changing operation.

2) Description of the Related Art

Generally, a vibration (acceleration shock) is generated upon pedaling of the accelerator pedal of an automobile (particularly upon sudden pedaling of the accelerator pedal). Such an acceleration shock arises from the fact that the engine torque changes suddenly in response to sudden pedaling of the accelerator pedal and a torsional vibration is generated in the driving system by the sudden change of the engine torque. Such a torsional vibration of the driving system as just mentioned appears as a vibration phenomenon of the vehicle body in the forward and backward direction.

As a countermeasure for suppressing such a vibration of a driving system generated in response to an operation of the accelerator pedal as described above, a method of opening the throttle slowly is known widely. This method, however, degrades the acceleration feeling. Also, another method for suppressing such a vibration as described above is known wherein a compensator (inverse filter) W(s) of an inverse function to an inherent transmission characteristic between the throttle opening and the driving torque [in other words, a model Gp(s) of a vehicle on which a vibration is excited] is provided as shown in FIG. 17 and this pre-compensator is used to control the throttle opening to suppress the torsional vibration and improve the responsibility.

Also, a two-stage torque inputting method is known wherein a stepwise input signal (accelerator opening variation) is inputted at two separate stages.

However, the prior art methods described above individually have subjects to be solved. In particular, the method which employs the inverse filter W(s) has a subject that, although a vibrational component of the output can be canceled, where the model Gp(s) of the vehicle is complicated, it is difficult to set an optimum inverse filter W(s). Meanwhile, the two-stage torque inputting method is not suitable for practical use because the target value must usually be known although some effect can be achieved for suppression of a vibration as seen from FIG. 18.

Incidentally, Japanese Patent Laid-Open No. 2001-132501 discloses an apparatus which detects a specific vehicle state amount and detects a rotational frequency component of a vehicle driving system included in the specific vehicle state amount and then changes the engine torque or the transmission gear ratio based on the detected rotational frequency component to suppress the vibration.

However, since the apparatus detects a specific vehicle state amount, it is necessary to take the displacement between a timing at which the state amount is generated and the timing at which a control adjustment amount originating from the generation of the state amount is outputted, that is, a period of dead time, into consideration. Thus, if it is tried to achieve a control process of a high degree of accuracy including the dead time, then a very heavy burden is imposed on the control processing apparatus, and this gives rise to a problem that it makes practical use of the apparatus difficult.

SUMMARY OF THE INVENTION

It is an object of the present invention to provide an output power controlling apparatus and method for an internal combustion engine which can suppress a vibration upon pedaling of an accelerator pedal or upon speed changing operation with a simple configuration.

In order to attain the object described above, according to an aspect of the present invention, there is provided an output power controlling apparatus for an internal combustion engine for controlling operation of an output power adjustment member based on a target toque correlation value, comprising a vibration component prediction section for predicting a vibration component to be generated on a vehicle from the target torque correlation value using a predetermined prediction model, and a feedback correction section for feedback correcting the target torque correlation value based on the vibration component predicted by the vibration component prediction section so as to suppress the vibration.

With the output power controlling apparatus for an internal combustion engine, since a vibration component which is generated on the vehicle is predicted using a predetermined prediction model from a target torque correlation value and a target torque correlation value is feedback corrected based on the predicted vibration component so as to suppress the vibration, it is possible to predict the vibration in advance and correct the target torque correlation value so as to suppress the predicted vibration. Consequently, generation of an otherwise possible vibration can be suppressed effectively. Besides, since the vibration component which may be generated on the vehicle is predicted using a predetermined prediction model from the target torque correlation value, there is no necessity to take dead time and so forth into consideration as in an alternative case wherein an actual vibration is fed back. Consequently, the control process can be simplified, and the vibration can be suppressed efficiently. It is to be noted that the output adjustment member may typically be a throttle, an ignition coil or an injector.

Preferably, the predetermined prediction model is set based on a transfer function of a second-order lag system. Where the output power controlling apparatus for an internal combustion engine is configured in this manner, since the transfer function of the secondary delay system exhibits high approximation to a stepwise variation of the target torque correlation value, the vibration can be suppressed effectively while the comparatively simple transfer function is used. In this instance, where a target vehicle attenuation coefficient is represented by $\zeta'$, an actual vehicle attenuation coefficient by $\zeta$, a natural frequency set in accordance with a transmission gear ratio by $\omega_n$, and a Laplace operator by s, preferably the transmission function is calculated in accordance with $1/(s^2+2\zeta\omega_n s+\omega_n^2)$ and a control gain K set by the feedback correction section is calculated in accordance with $K=(\zeta'-\zeta)\cdot 2\omega_n$.

Preferably, the feedback correction section includes a control gain variation section for setting a control gain to a higher value in response to an increase of the vibration component predicted by the vibration component prediction section. In this instance, since the control gain in the direction in which the vibration is suppressed is set to an increased value in response to an increase of the vibration component, the vibration can be suppressed effectively.

Preferably, the vibration component prediction and the feedback correction are carried out earlier by at least three strokes than generation of the output power of the engine. In this instance, since the feedback correction by prediction is performed in good time taking delay factors such as dead time into consideration, the vibration can be prevented effectively.

Preferably, the target torque correlation value is calculated based on an accelerator opening, and the output power adjustment member is controlled based on the target torque correlation value after corrected. Also where the configuration just described is employed, a shock upon acceleration can be prevented effectively.

According to another aspect of the present invention, there is provided an output power controlling method for an internal combustion engine for controlling operation of an output power adjustment member based on a target toque correlation value, comprising a vibration component prediction step of predicting a vibration component to be generated on a vehicle from the target torque correlation value using a predetermined prediction model, and a feedback correction step of feedback correcting the target torque correlation value based on the vibration component predicted by the vibration component prediction step so as to suppress the vibrations.

With the output power controlling method for an internal combustion engine, since a vibration component which is generated on the vehicle is predicted using a predetermined prediction model from a target torque correlation value and a target torque correlation value is feedback corrected based on the predicted vibration component so as to suppress the vibration, it is possible to predict the vibration in advance and correct the target torque correlation value so as to suppress the predicted vibration. Consequently, generation of an otherwise possible vibration can be suppressed effectively. Besides, since the vibration component which may be generated on the vehicle is predicted using a predetermined prediction model from the target torque correlation value, there is no necessity to take dead time and so forth into consideration as in an alternative case wherein an actual vibration is fed back. Consequently, the control process can be simplified, and the vibration can be suppressed efficiently. It is to be noted that the output adjustment member may typically be a throttle, an ignition coil or an injector.

Preferably, the predetermined prediction model is set based on a transfer function of a second-order lag system. Where the output power controlling apparatus for an internal combustion engine is configured in this manner, since the transfer function of the secondary delay system exhibits high approximation to a stepwise variation of the target torque correlation value, the vibration can be suppressed effectively while the comparatively simple transfer function is used. In this instance, where a target vehicle attenuation coefficient is represented by $\zeta'$, an actual vehicle attenuation coefficient by $\zeta$, a natural frequency set in accordance with a transmission gear ratio by $\omega_n$, and a Laplace operator by s, preferably the transmission function is calculated in accordance with $1/(s^2+2\zeta\omega_n s+\omega_n^2)$ and a control gain K set by the feedback correction section is calculated in accordance with $K=(\zeta'-\zeta)\cdot 2\omega_n$.

Preferably, the feedback correction step includes a control gain variation step of setting a control gain to a higher value in response to an increase of the vibration component predicted by the vibration component prediction step. In this instance, since the control gain is set in the direction in which the vibration is suppressed to an increased value in response to an increase of the vibration component, the vibration can be suppressed effectively.

Preferably, the vibration component prediction and the feedback correction are carried out earlier by at least three strokes than generation of the output power of the engine. In this instance, since the feedback correction by prediction is performed in good time taking delay factors such as dead time into consideration, the vibration can be prevented effectively.

Preferably, the target torque correlation value is calculated based on an accelerator opening, and the output power adjustment member is controlled based on the target torque correlation value after corrected. Also, where the configuration just described is employed, a shock upon acceleration can be prevented effectively.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
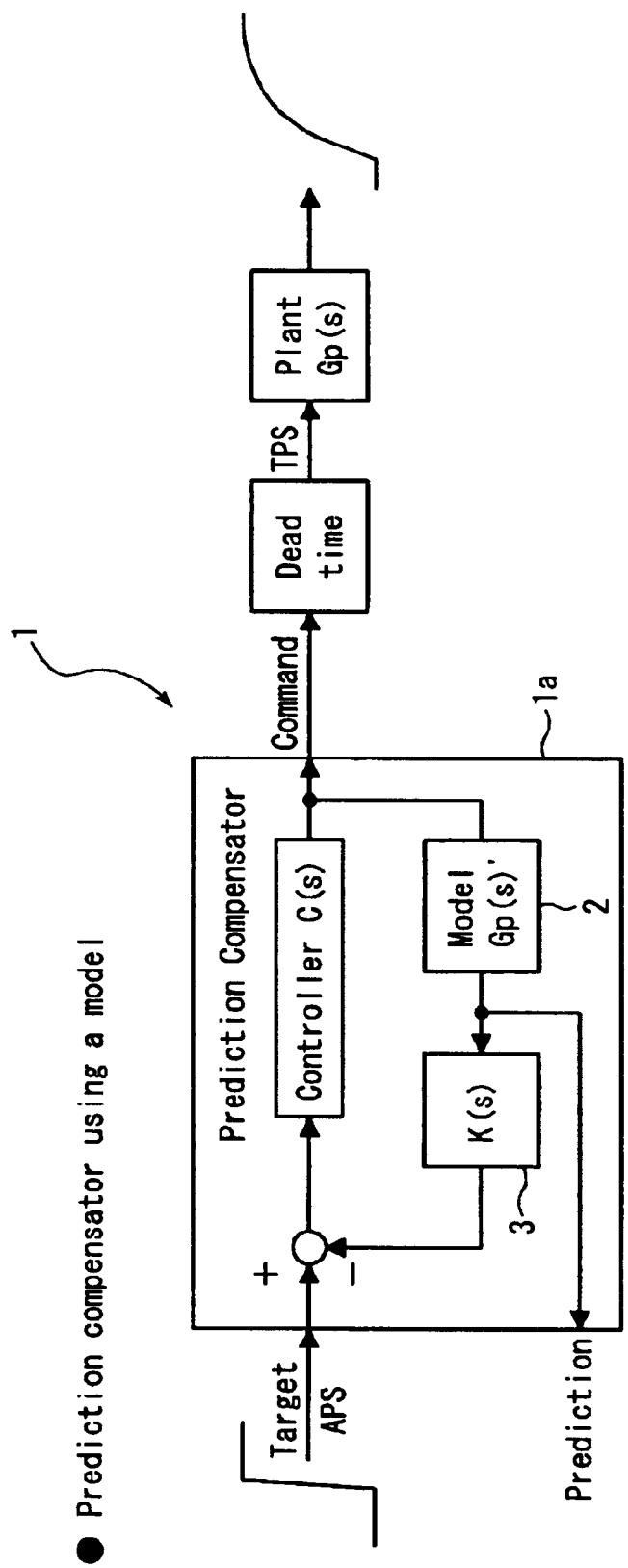
FIG. 1 is a control block diagram showing a configuration of essential part of an output power controlling apparatus for an internal combustion engine according to an embodiment of the present invention.

In the following, an output power controlling apparatus for an internal combustion engine according to an embodiment of the present invention is described with reference to the drawings. It is to be noted that the following description is given of a case wherein the present invention is applied to an engine (gasoline engine) which includes a throttle apparatus of the throttle-by-wire type wherein an accelerator pedal and a throttle are electrically connected to each other.

First, essential part of the present invention is described with reference to FIG. 1. As seen from FIG. 1, a vehicle includes a controller (control means or ECU) 1 which receives accelerator opening information APS (a target torque correlation value: Target) as an input signal thereto and generates an output signal TPS for controlling operation of the throttle (output power adjustment member) in accordance with the input signal.

The controller 1 includes a prediction compensator 1a. The prediction compensator 1a in turn includes a vibration component prediction section (vibration component prediction step) 2 for predicting a vibration component to be generated on the vehicle using a predetermined prediction model Gp(s)' from the input signal, and a feedback correction section (feedback correction step) 3 for feedback correcting the input signal based on the vibration component (prediction value) predicted by the vibration component prediction section 2 so as to suppress the vibration.

The predetermined prediction model Gp(s)' of the vibration component prediction section 2 particularly is a transfer function G(s) of a secondary delay system and can be represented as $$G(s)=1/(s^2+2\zeta\omega_n s+\omega_n^2)$$

where $\zeta$ is an actual vehicle attenuation coefficient and $\omega_n$ is a natural frequency set in accordance with a transmission gear ratio.

Meanwhile, a control gain K corrected by the feedback correction section 3 can be represented as $$K=(\zeta'-\zeta)\cdot 2\omega_n$$

where $\zeta'$ is a target vehicle attenuation coefficient.

It is to be noted that a function C(s) in the prediction compensator 1a is a function for converting an input (in the present embodiment, the accelerator opening APS) into an output (similarly the throttle opening TPS) and is not limited specifically, and various functions can be applied as the function C(s). In order to simplify the description, it is assumed that, in the present embodiment, C(s)=1.

Further, according to the present invention, the prediction compensator 1a does not include dead time which must be taken into consideration by the apparatus disclosed in Japanese Patent Laid-Open No. 2001-132501 mentioned hereinabove. As a result, the prediction compensator 1a can be simplified, and various control methods can be applied to obtain a prediction value (Prediction) from a target value (Target). In order to further reduce a vibration of a vehicle, for example, by state feedback, it is possible to assign arbitrary damping (Pole assignment). In the present embodiment, taking such a case that some non-linearity is involved into consideration (in an engine for an automobile, the generated torque exhibits non-linearity with respect to an accelerator operation), such simple damping that force is applied conversely to the speed is assigned as seen in FIG. 1.

Figure 3:
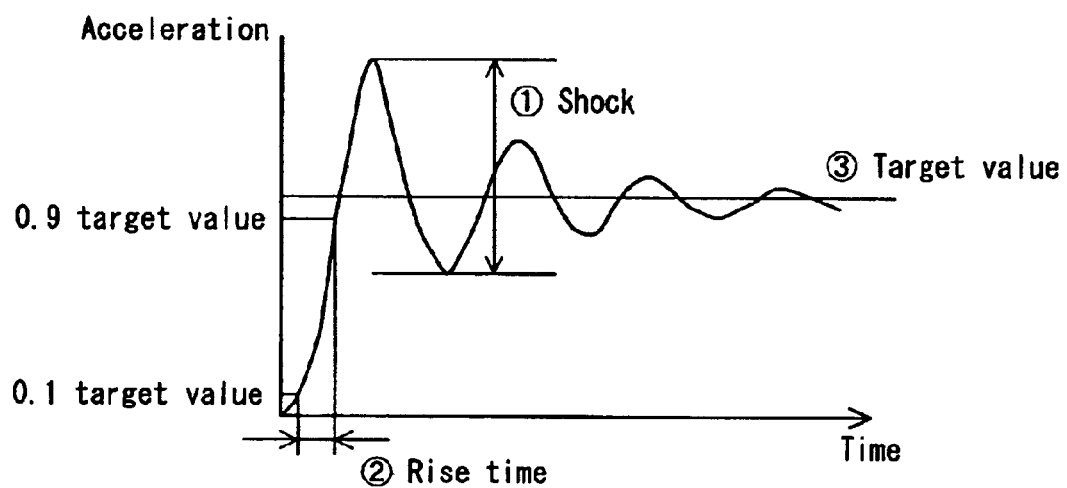
FIG. 3 is a diagram illustrating a target acceleration of the output power controlling apparatus for an internal combustion engine.

In the present embodiment, the engine output power is controlled so as to suppress a vehicle vibration without degrading the acceleration feeling, and FIG. 3 shows a waveform of the forward and backward acceleration of the vehicle in ordinary acceleration. Where the compensator 1a is additionally provided, a target acceleration is set from the waveform paying attention to three factors of ① to ③. It is to be noted that ① to ③ given below correspond to ① to ③ of FIG. 3, respectively.

① Reduction of the shock: since the shock is an acceleration in the negative direction which is contrary to the will to accelerate, attenuation is applied to reduce the shock to 0.1 G or less so that the passenger may not have a disagreeable feeling.

② Maintenance of the rise time: since the rise time (time in which the actual value rises from 10% to 90% of the target value) is a factor of providing an acceleration feeling, it is held from variation as far as possible.

③ Follow-up of the target value: a condition in which the driver can drive. The acceleration is converged to a value indicated by the accelerator pedal after lapse of a certain interval of time so that a feedback operation of the driver may not be performed because of shortage of the target value as a result of the control.

1. Production of a Vehicle Model

Figure 2:
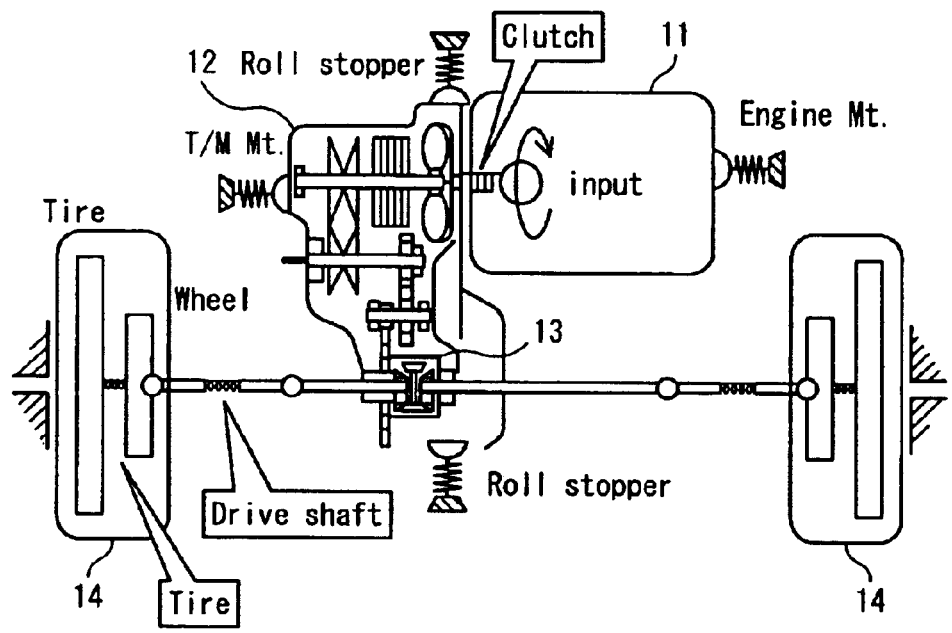
FIG. 2 is a schematic view showing a driving system model of a vehicle to which the output power controlling apparatus for an internal combustion engine is applied.

A vehicle model was produced based on FIG. 2. The vehicle model includes a driving system torsion model of an engine 11~transmission 12~differential gear 13~tires 14, and a vehicle motion model of mounts, suspensions and so forth for transmitting a torsional vibration of the driving system to the vehicle body with the elasticity of them taken into consideration. The vehicle model was produced as a two-dimensional non-linear model having totaling 10 degrees of freedom including three degrees of freedom of the fly wheel, gears and tires, one degree of freedom of the suspensions, three degrees of freedom of forward and backward motion, upward and downward motion and rotation of the power plant (engine and transmission) and the body as a rigid body. Where the vehicle model is represented in a matrix with attenuation of the factors taken into consideration, it is given by the following expression (1):

$$[M]\{\ddot{X}\}+[C]\{\dot{X}\}+[K]\{X\}=\{F\} \tag{1}$$

where [M]: 10×10 inertia matrix
  [C]: 10×10 attenuation matrix
  [K]: 10×10 stiffness matrix
  {F}: 10×1 force vector
  {X}: 10×1 displacement vector
  $\dot{X}$: speed (first-order differentiation)
  $\ddot{X}$: acceleration (second-order differentiation)

Parameter correction for the matrices of the expression given above was performed through an actual vehicle test.

Figure 4:
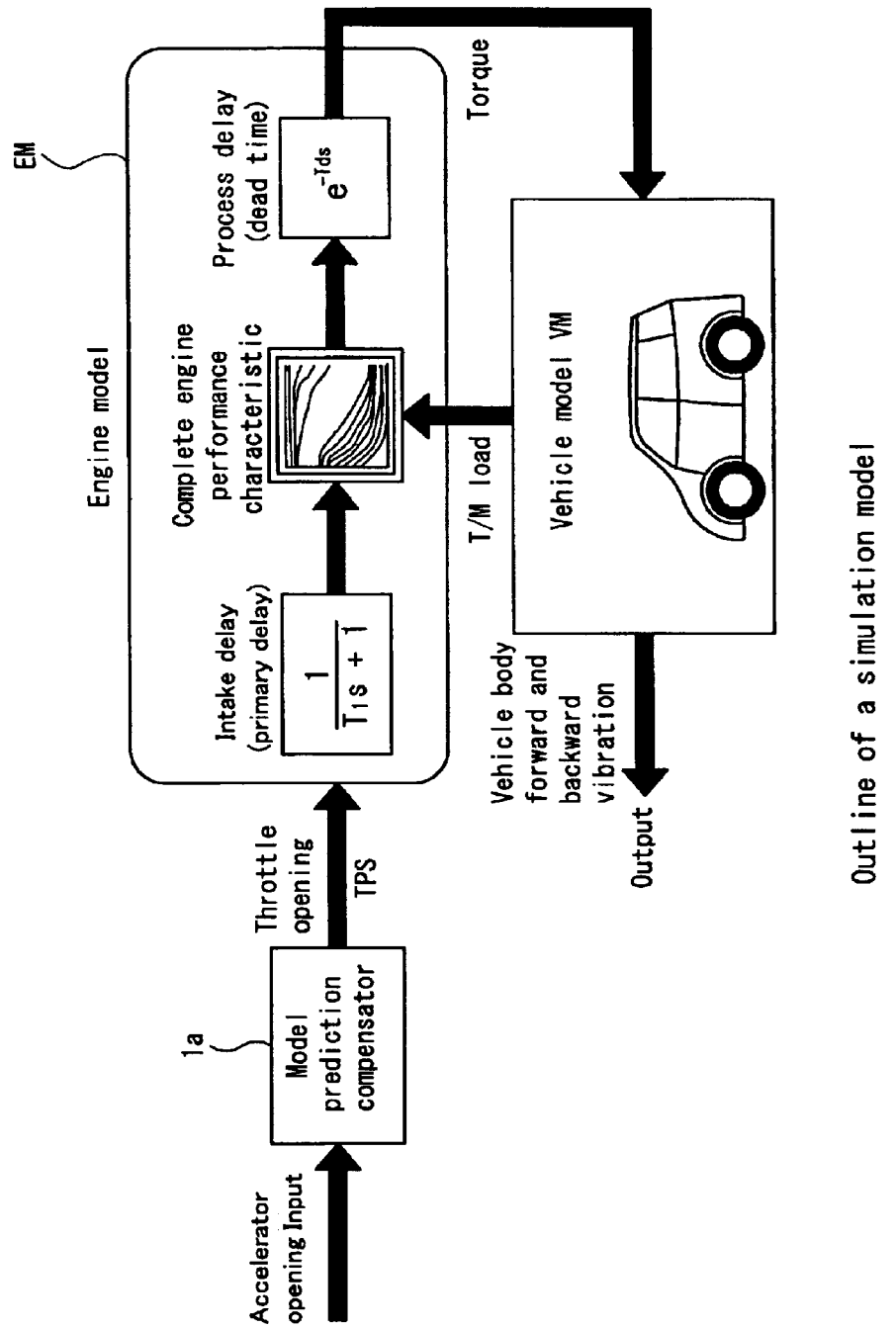
FIG. 4 is a diagrammatic view showing a simulation model of the output power controlling apparatus for an internal combustion engine.

FIG. 4 shows an outline of an entire simulation model. As seen in FIG. 4, the simulation model includes three blocks of a model prediction compensator 1a, an engine model EM and a vehicle model VM of 10 degrees of freedom. Further, in the present embodiment, a complete performance characteristic map and a delay factor are used for the engine model EM. The delay factor was produced taking an intake delay (primary delay) by the intake pipe and a process delay (dead time) converted as a torque after a delay by 3 strokes from an intake stoke to a combustion stroke into consideration. Further, the engine whole performance map receives transmission load information as an input thereto from the vehicle model VM. Furthermore, the vehicle model VM outputs vehicle forward and backward vibration information.

2. Conversion of a Prediction Model into a Lower Dimensional Model

Generally, the transfer function from an input u(s) to an output y(s) of an nth-order system can be represented by the following expression (2):

$$G(s) = \frac{y(s)}{u(s)} = \frac{b_m s^m + b_{m-1} s^{m-1} + \cdots + b_1 s + b_0}{s^n + a_{n-1} s^{n-1} + \cdots + a_1 s + a_0} \quad (2)$$

However, in control for which the real time controllability is required, to perform arithmetic operation of the high-order transfer function of the expression (2) using a popular MPU (Micro Processing Unit) is disadvantageous in terms of the operation speed and the accuracy. Accordingly, it is necessary to appropriately convert a model into a lower-dimensional model within a range within which the original properties of the model are not sacrificed.

Figure 5:
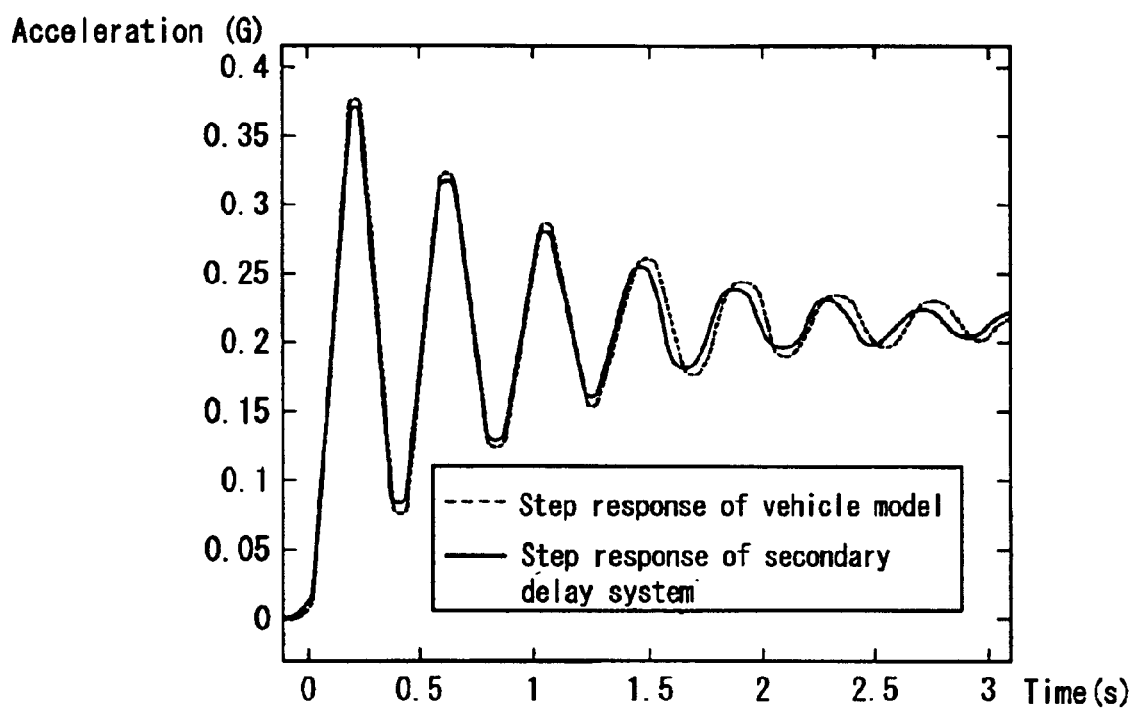
FIG. 5 is a diagram illustrating a step response of a secondary delay system and a high-order step response for comparison in the output power controlling apparatus for an internal combustion engine.

Incidentally, the output waveform of the vehicle body forward and backward acceleration (or drive shaft angular acceleration) of the output power in response to a stepwise accelerator opening variation (APS) or throttle opening variation (TPS) can be approximated to a response of a second order delay system from a characteristic of the waveform (refer to FIG. 5). In particular, where the transfer characteristic from the accelerator opening information APS to the vehicle body forward and backward acceleration is represented by G(s), G(s) can be approximated with the following expression (3):

$$G(s) \approx \frac{K_p \omega_n^2}{(s^2 + 2\zeta\omega_n s + \omega_n^2)} \quad (3)$$

where $K_p$ is a proportional gain, $\zeta$ and $\omega_n$ are an attenuation coefficient and a natural frequency (basic order) of the vehicle body forward and backward vibration, respectively, and s is a Laplace operator.

The expression (3) can be used as a prediction model to form the prediction model compensator 1a.

Figure 6:
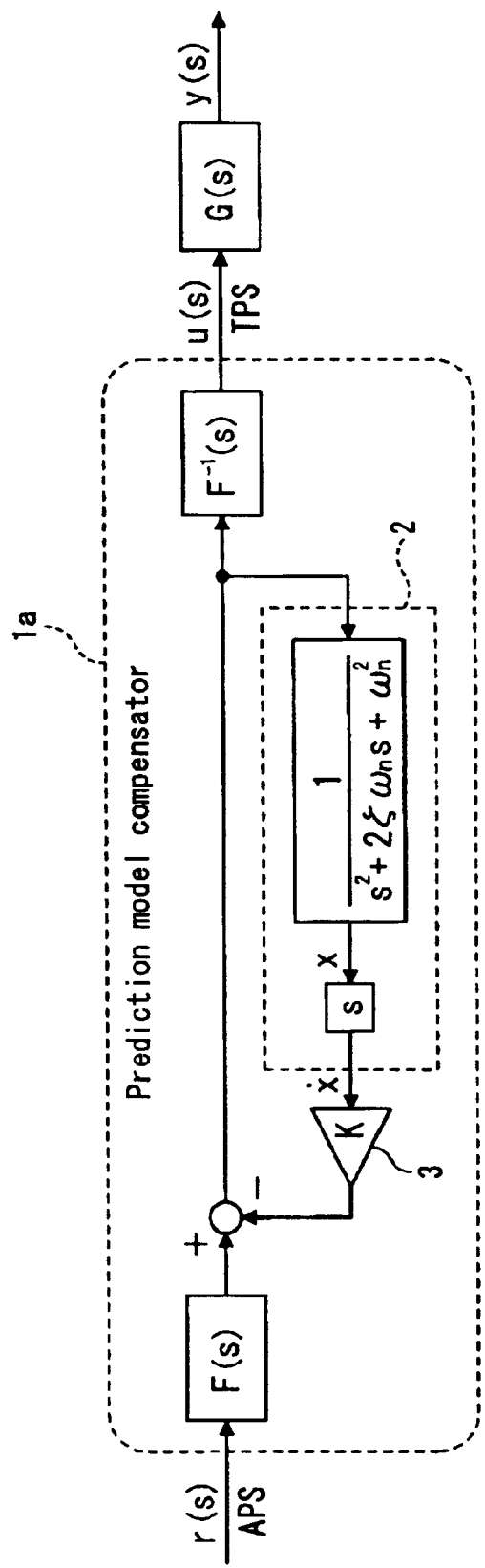
FIG. 6 is a block diagram showing essential part of the output power controlling apparatus for an internal combustion engine.

Here, such a feedback control system as shown in FIG. 6 is considered as the prediction model compensator 1a. Referring to FIG. 6, a function F(s) is used to convert an inputted accelerator opening (APS) into an output torque. Another function $F^{-1}(s)$ is used to convert an inputted torque into a throttle opening (TPS).

The vibration component prediction section 2 in the feedback control system has a transfer function $G(s)=1/(s^2 + 2\zeta\omega_n s + \omega_n^2)$ of the secondary delay system and a differentiation part which differentiates a displacement x outputted from the transfer function G(s) and outputs a displacement speed dx/dt (represented by ẋ in FIG. 6). Meanwhile, the feedback correction section 3 feedback corrects an attenuation torque to the output of the function F(s) so as to suppress the vibration based on the vibration component dx/dt predicted by the vibration component prediction section 2.

Here, the output signal u(s) can be represented by the following expression (4) using the input signal r(s)

$$u(s) = r(s) - \frac{K \cdot s}{s^2 + 2\zeta\omega_n s + \omega_n^2} u(s) \quad (4)$$

Accordingly, the closed loop transfer function from the input signal r(s) to the output signal u(s) is given by the following expression (5):

$$\frac{u(s)}{r(s)} = \frac{s^2 + 2\zeta\omega_n s + \omega_n^2}{s^2 + 2(\zeta + K/2\omega_n)\omega_n s + \omega_n^2} \quad (5)$$

Then, the transfer function from the input r(s) to the output y(s) is given as the following expression (6) from the expressions (3) and (5):

$$\frac{y(s)}{r(s)} = \frac{u(s)}{r(s)} \frac{y(s)}{u(s)} = \frac{K_p \omega_n^2}{s^2 + 2(\zeta + K/2\omega_n)\omega_n s + \omega_n^2} \quad (6)$$

Further, through substitution of $$\zeta' = \zeta + K/2\omega_n \quad (7)$$

in the expression (6), a target attenuation coefficient $\zeta'$ is obtained by adjusting the gain K.

Figure 14:
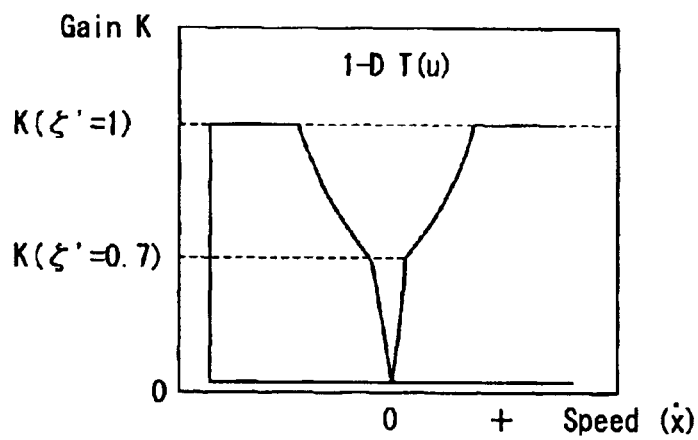
FIGS. 14 and 15 are diagrams showing a control gain variation section (control gain variation step) of the output power controlling apparatus for an internal combustion engine.
Figure 15:
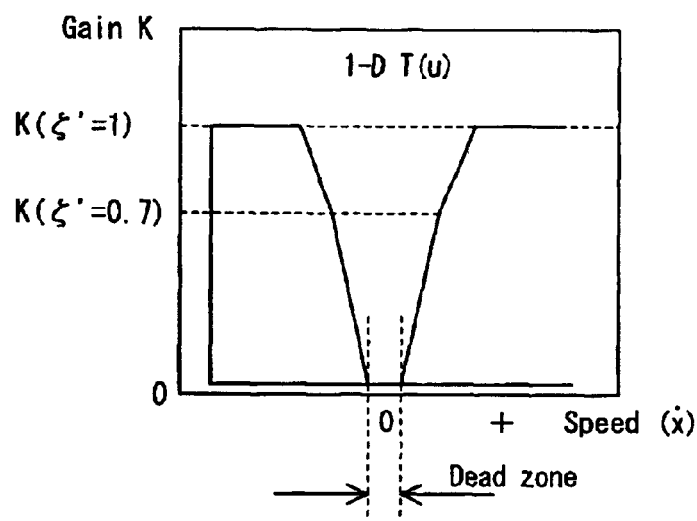
Figure 16:
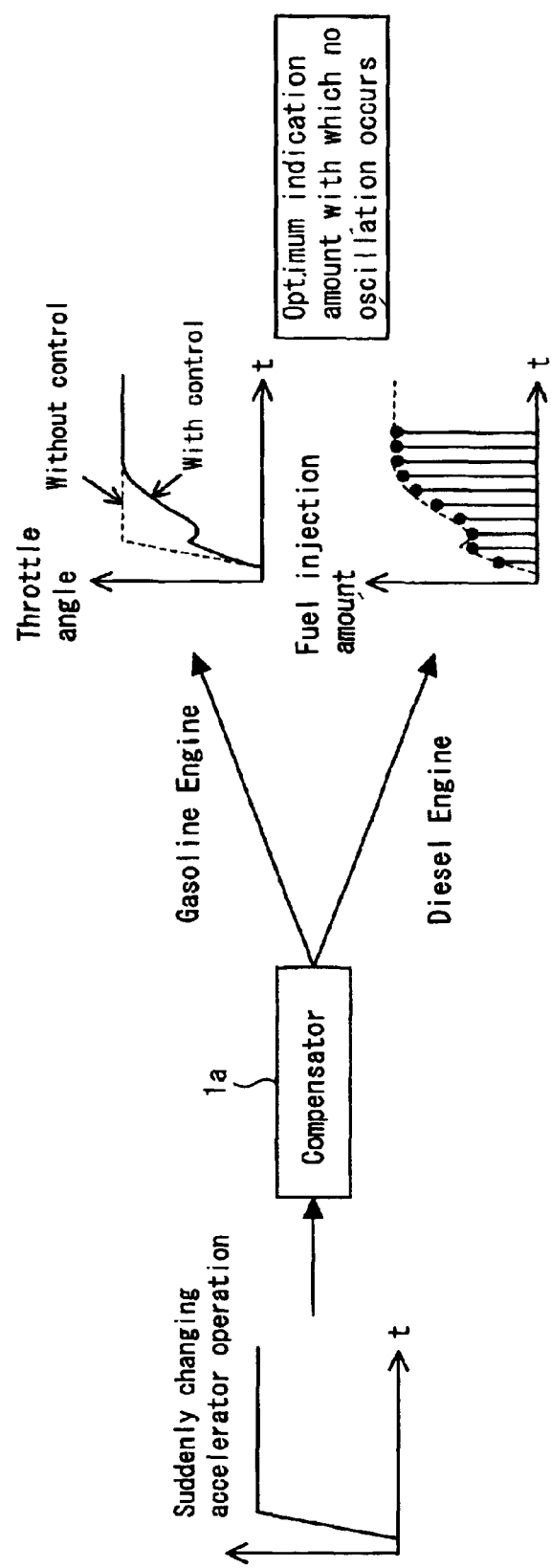
FIG. 16 is a diagram illustrating operation characteristics of a control object where the output power controlling apparatus for an internal combustion engine shown in FIG. 1 is applied to a gasoline engine and a diesel engine.
Figure 17:
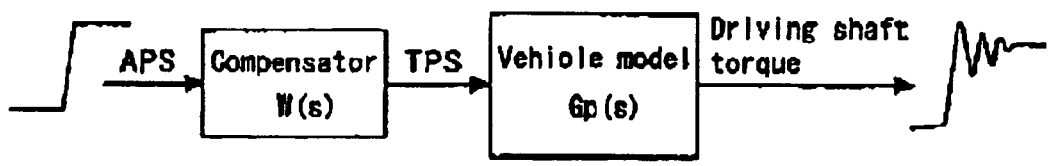
FIG. 17 is a block diagram showing a prior art apparatus.
Figure 18:
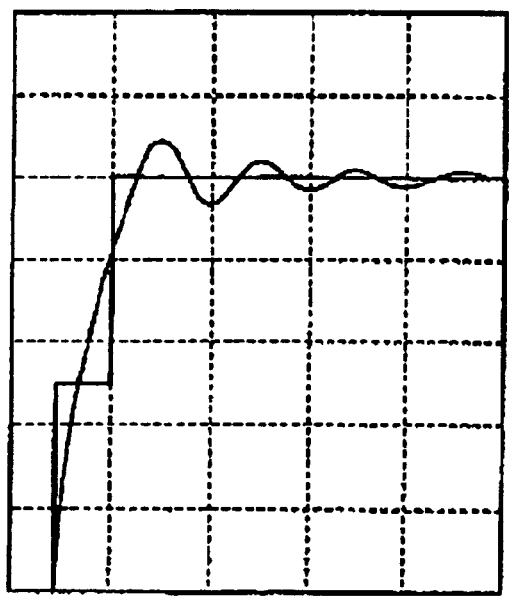
FIG. 18 is a diagram illustrating a vibration suppression effect of the prior art apparatus shown in FIG. 17.

Here, it is possible to provide the feedback correction section 3 shown in FIG. 1 with a control gain variation section (control gain variation step) (not shown) for setting the control gain K. The gain K has a value determined in all cases if the target attenuation coefficient $\zeta'$ and the natural frequency $\omega_n$ are determined. However, it is possible to additionally vary the target attenuation coefficient $\zeta'$ in response to the speed of the vehicle body vibration amplitude to adjust the effectiveness of the gain K (the degree of action). For example, the gain K may be set so that the gain of the target attenuation $\zeta'=1$ may act within a certain range of the vibration speed as seen in FIG. 14. Or, the gain K may be set so as to have a dead zone so that the gain may not act within the predetermined range of the vibration speed as seen in FIG. 15.

Where the control gain is variably set so that the control gain in the direction in which the vibration is suppressed may increase in response to an increase of the vibration component in this manner, the vibration suppression effect can be enhanced.

3. Confirmation of Effects of a Prediction Model Compensator by Simulation

Hereinafter is a description of a vibration suppression effect by the prediction compensator 1a at a maximum transmission gear ratio (for example, the first speed) with which acceleration shock matters most.

Figure 7:
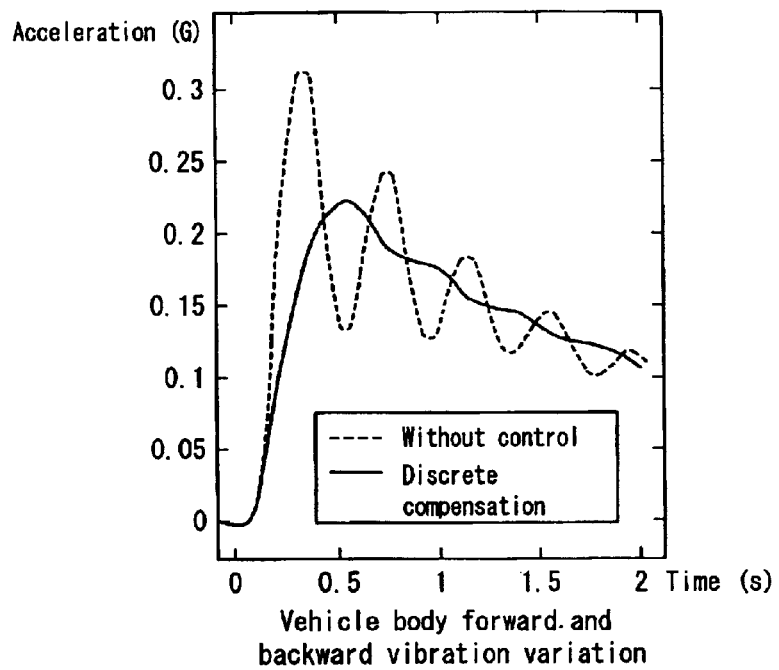
FIG. 7 is a diagram illustrating operation and effects of the output power controlling apparatus for an internal combustion engine.
Figure 8:
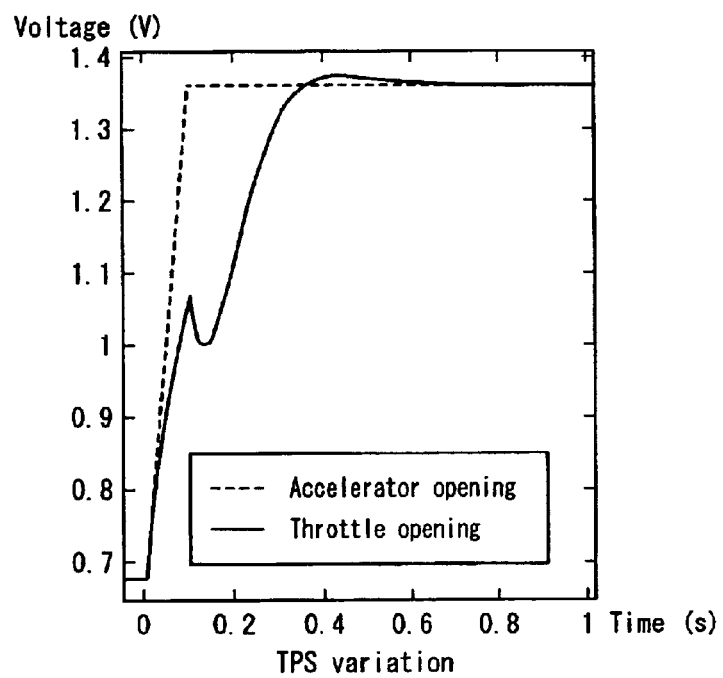
FIG. 8 is a diagram illustrating different operation and effects of the output power controlling apparatus for an internal combustion engine.

The simulation conditions were that the prediction compensator 1a was discretized (sample time=10 ms) and that the input accelerator opening information APS was varied stepwise up to a target value for 0.1 second, and the vibration-damping effect was confirmed. As a result, it was confirmed that the amplitude of the vehicle body forward and backward vibration exhibited a significant decrease by the insertion of the prediction compensator 1a in FIG. 7. It is to be noted that, in FIG. 8, a broken line indicates the variation of the accelerator opening. Where the prediction compensator 1a is provided to suppress the vibration for such a stepwise acceleration opening variation as indicated by the broken line, the throttle opening is controlled in accordance with such a characteristic as indicated by a solid line in FIG. 8.

Incidentally, the prediction compensator 1a in the present embodiment may possibly exhibit some degradation of the vibration suppression effect thereof due to the presence of an error of a resonance frequency or the like caused by variation of the vehicle weight by an increase or decrease of the number of passengers or loading or by a difference between the actual transmission gear ratio and the target transmission gear ratio.

Figure 9:
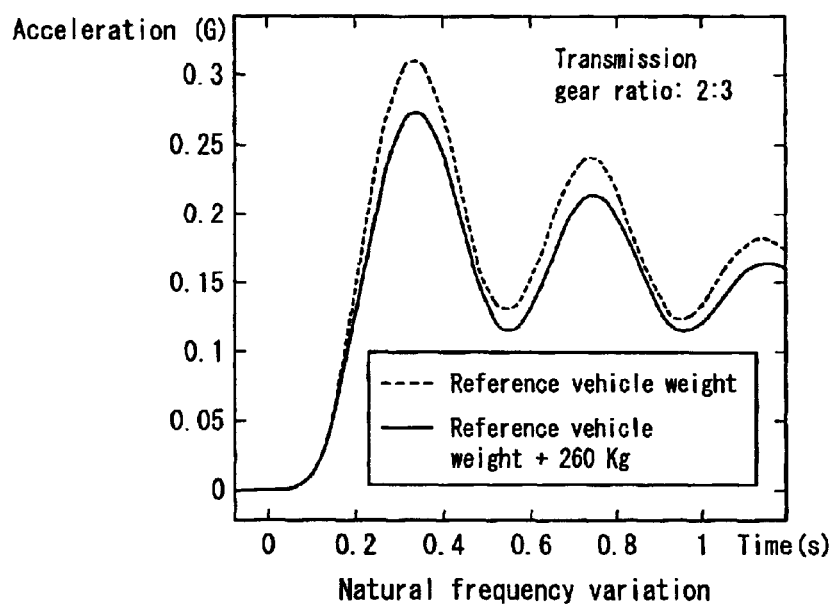
FIGS. 9 and 10 are diagrams illustrating different variations of the natural frequency of the output power controlling apparatus for an internal combustion engine.
Figure 10:
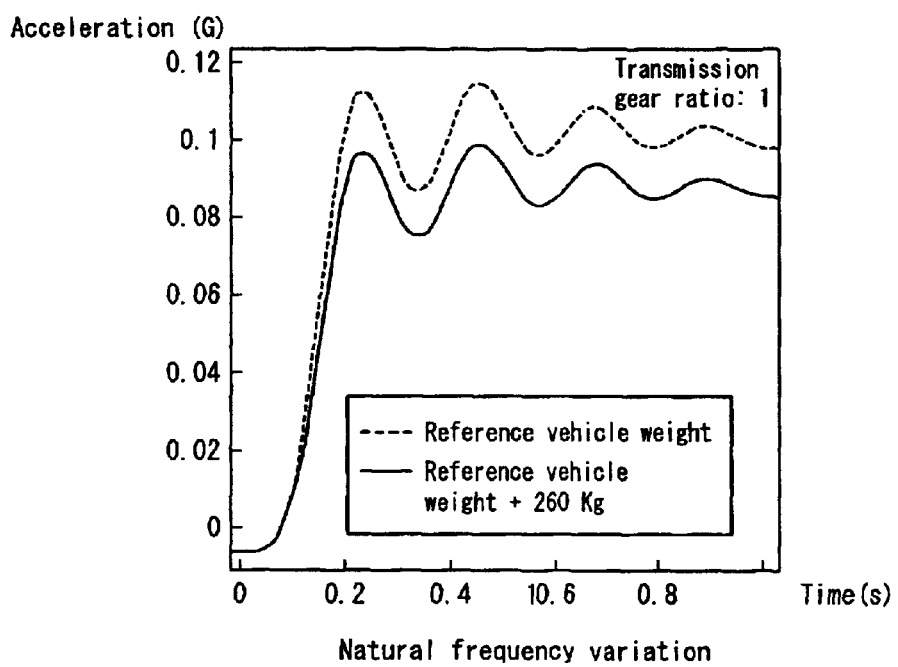

Therefore, degradation in performance of a compensator arising from such an error as just described was examined. More particularly, the resonance frequency variation when the vehicle weight exhibited increase by 260 kg (it was assumed that the body weight per one person was 65 kg and four passengers got on the vehicle except the driver) due to increase of the number of passengers or the like was simulated. It is to be noted that FIG. 9 illustrates the resonance frequency variation where the transmission gear ratio is 2.3 while FIG. 10 illustrates the resonance frequency variation where the transmission gear ratio is 1. As a result, it was confirmed that a frequency variation of less than 2% was involved at both of the transmission gear ratios and no significant variation of the resonance frequency was involved.

Figure 11:
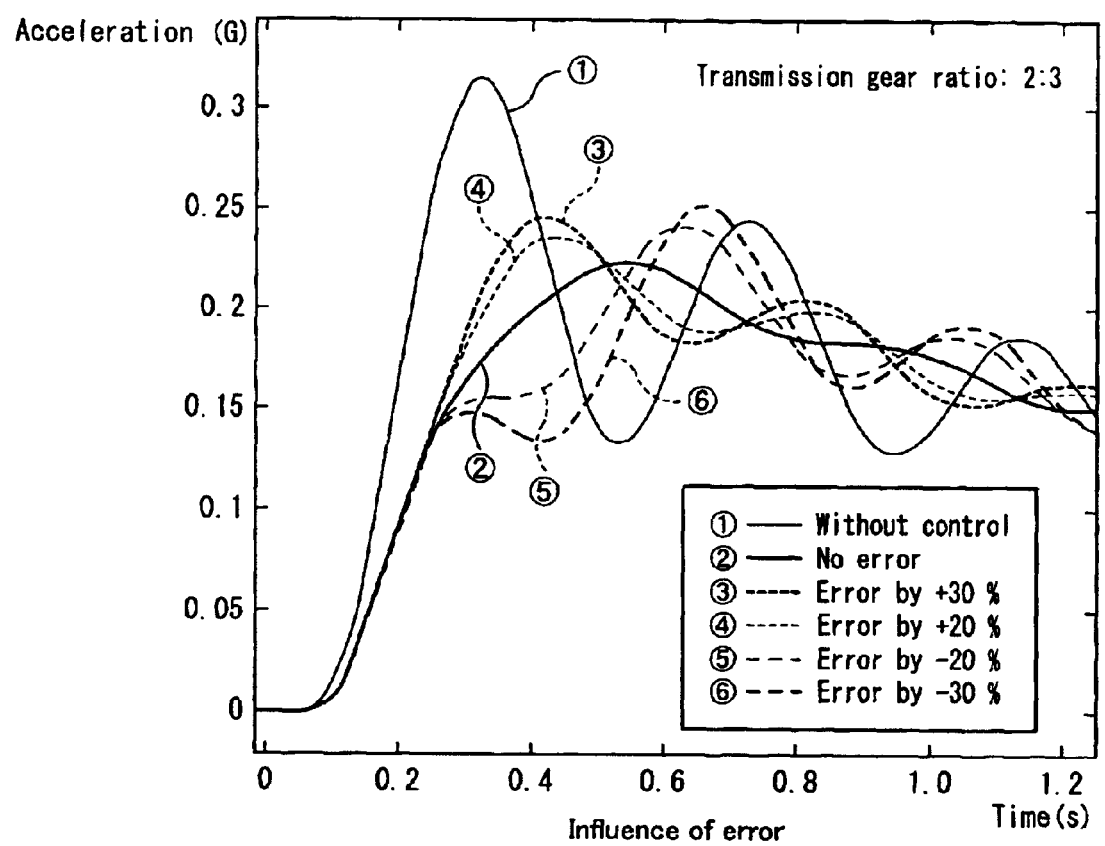
FIG. 11 is a diagram illustrating an influence of an error in the output power controlling apparatus for an internal combustion engine.

Then, it was assumed that the actual resonance frequency exhibited an error of −30% to +30% due to an error in measurement or some other disturbance, and performance degradation of the discrete compensator was examined (refer to FIG. 11). As a result, it was confirmed that, where the acceleration performance was taken into consideration, less performance degradation was involved with an error on the + side, that is, where the measured resonance frequency was higher than the actual resonance frequency.

Further, it was confirmed that, even where some error is involved, insertion of the prediction compensator 1*a* does not render the system unstable.

4. Confirmation of Vibration Suppression by an Actual Vehicle Test

Figure 12:
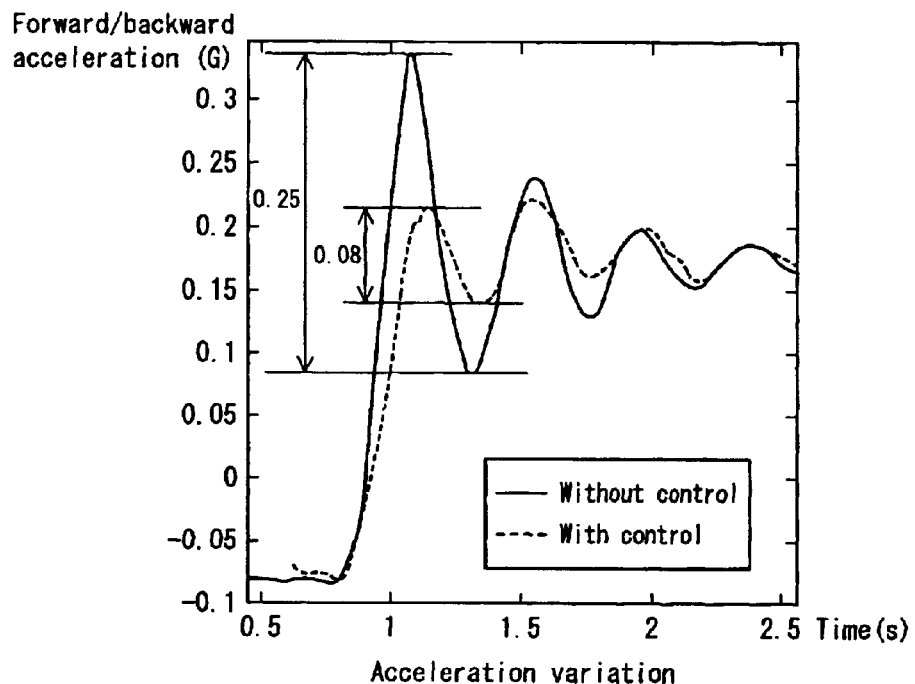
FIGS. 12 and 13 are diagrams illustrating different operation and effects of the output power controlling apparatus for an internal combustion engine.
Figure 13:
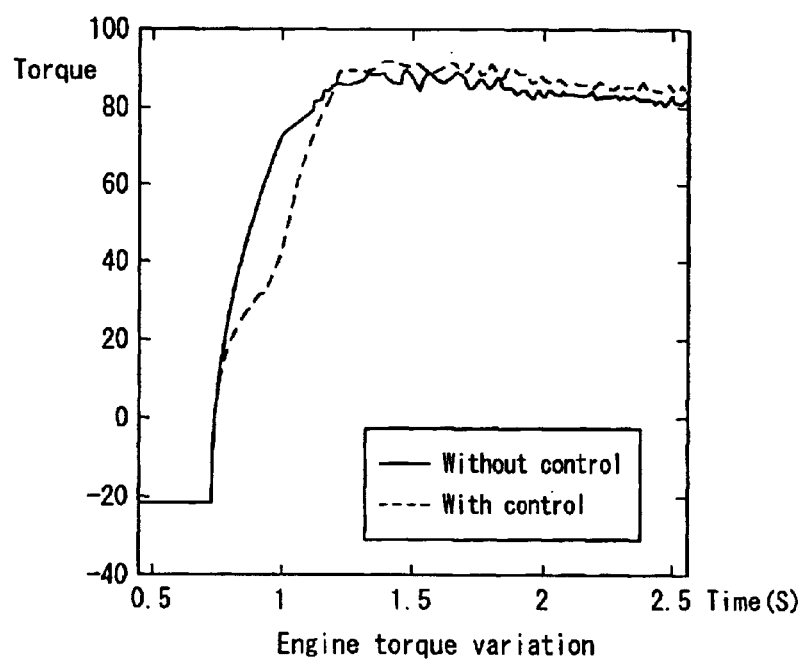

Further, an actual vehicle test was performed to confirm the effect. The test conditions were that the transmission was fixed to the lowest shift position (transmission gear ratio= 2.3) with which the vehicle is subject to the most significant acceleration shock, that it was confirmed that the direct-coupling clutch of the torque converter was in the directly coupling state from a gradual deceleration state to eliminate an influence of moderation of the acceleration shock by the direct-coupling clutch and that re-acceleration was performed when the engine speed rose to 1,500 rpm. In order to make the acceleration condition uniform, the maximum value of the torque variation was fixed to 100 Nm. FIG. 12 illustrates the vehicle body forward and backward acceleration, and FIG. 13 illustrates the engine torque variation. From the results just mentioned, where the output power controlling apparatus for an internal combustion engine of the present invention is used, the vibration (shock) can be reduced down to 0.08 G which is within the allowable range without degrading the acceleration performance.

As described above, since a vibration component which is generated on a vehicle is predicted using a predetermined prediction model from inputted accelerator opening information (a target torque correlation value) and the accelerator opening is feedback corrected based on the predicted vibration component so as to suppress the vibration, it is possible to predict the vibration in advance and correct the accelerator opening so as to suppress the predicted vibration. Consequently, generation of a vibration can be suppressed effectively. Further, since a vibration component which may be generated on the vehicle is predicted using a predetermined prediction model from the accelerator opening information, there is no necessity to take dead time and so forth into consideration as in a case wherein an actual vibration is fed back. Consequently, the control process can be simplified, and the vibration can be suppressed efficiently.

Further, although the predetermined prediction model described above is set based on a transmission function of a secondary delay system, since the transfer function of the secondary delay system exhibits high approximation to a stepwise variation of the input, the vibration can be suppressed effectively while the comparatively simple transfer function is used.

Furthermore, since the control gain variable setting section provided in the feedback correction section 3 sets the control gain to an increased value in response to an increase of the vibration component predicted by the vibration component prediction section 2, the control gain in the direction in which the vibration is suppressed is set to an increased value in response to the increase of the vibration component. Consequently, the vibration can be suppressed effectively.

Further, if the vibration component prediction and the feedback correction are carried out earlier by at least three strokes than generation of the output power of the engine, then since the feedback correction by prediction is performed in good time taking delay factors such as dead time into consideration, the vibration can be prevented effectively.

Preferably, the target torque correlation value is calculated based on the accelerator opening, and the operation of the out put power adjustment member is adjusted based on the corrected target torque correlation value. Also, where the configuration just described is employed, a shock upon acceleration can be prevented effectively.

It is to be noted that, while an embodiment of the present invention has been described above, the present invention is not limited to the configuration described above, but various alterations and modifications are possible without departing from the scope and the spirit of the present invention. For example, while, in the embodiment described above, the throttle is applied as an example of the output power adjustment member, an ignition coil, an injector or some other member may be applied as the output power adjustment member. Further, while, in the embodiment described above, the present invention is applied to a gasoline engine, the present invention can naturally be applied also to a diesel engine. In this instance, similar control to that in the embodiment described above may be applied except that the output is replaced by a fuel injection amount.

What is claimed is:

1. An output power controlling apparatus for an internal combustion engine, comprising:
    an output power adjustment section for controlling output power of the engine based on a target torque correlation value;
    a vibration component prediction section for predicting a vibration component to be generated on a vehicle from the target torque correlation value using a predetermined prediction model; and
    a feedback correction section for feedback correcting the target torque correlation value based on the vibration component predicted by said vibration component prediction section to suppress the vibration,
    wherein said feedback correction section includes a control variation section for setting a control gain based on the vibration component predicted by said vibration component prediction section.

2. The output power controlling apparatus for an internal combustion engine as claimed in claim 1, wherein said control gain variation section sets the control gain to a higher value in response to an increase of the vibration component predicted by said vibration component prediction section.

3. The output power controlling apparatus for an internal combustion engine as claimed in claim 1, wherein the target torque correlation value is calculated based on an accelerator opening.

4. The output power controlling apparatus for an internal combustion engine as claimed in claim 1, wherein the output power adjustment member comprises one of a throttle, an ignition coil, and an injector.

5. An output power controlling apparatus for an internal combustion engine, comprising:
an output power adjustment section for controlling output power of the engine based on a target torque correlation value;
a vibration component prediction section for predicting a vibration component to be generated on a vehicle from the target torque correlation value using a predetermined prediction model; and
a feedback correction section for feedback correcting the target torque correlation value based on the vibration component predicted by said vibration component prediction section to suppress the vibration,
wherein the predetermined prediction model is set based on a transfer function of a second-order lag system.

6. The output power controlling apparatus for an internal combustion engine as claimed in claim 5, wherein, where a target vehicle attenuation coefficient is represented by $\zeta'$, an actual vehicle attenuation coefficient by $\zeta$, a natural frequency set in accordance with a transmission gear ratio by $\omega_n$, and a Laplace operator by s, the transfer function is calculated in accordance with $$1/(s^2+2\zeta\omega_n s+\omega_n^2)$$

and a control gain K set by said feedback correction section is calculated in accordance with $$K=(\zeta'-\zeta)\cdot 2\omega_n.$$

7. A method of controlling an output power adjustment member of an internal combustion engine based on a target torque correlation value, comprising the steps of:
predicting a vibration component to be generated on a vehicle from the target torque correlation value using a predetermined prediction model; and
feedback correcting the target torque correlation value based on the vibration component predicted by the vibration component prediction step to suppress the vibrations,
wherein the feedback correction step includes the step of setting a control gain variation based on the vibration component predicted by said vibration component prediction section.

8. The method as claimed in claim 7, wherein the control gain variation setting step sets the control gain to a higher value in response to an increase of the vibration component predicted by the vibration component prediction step.

9. The method as claimed in claim 7, wherein the target torque correlation value is calculated based on an accelerator opening.

10. The method as claimed in claim 7, wherein the output power adjustment member comprises one of a throttle, an ignition coil, and an injector.

11. A method of controlling an output power adjustment member of an internal combustion engine based on a target torque correlation value, comprising the steps of:
predicting a vibration component to be generated on a vehicle from the target torque correlation value using a predetermined prediction model; and
feedback correcting the target torque correlation value based on the vibration component predicted by the vibration component prediction step to suppress the vibrations,
wherein the predetermined prediction model is set based on a transfer function of a second-order lag system.

12. The method as claimed in claim 11, wherein, where a target vehicle attenuation coefficient is represented by $\zeta'$, an actual vehicle attenuation coefficient by $\zeta$, a natural frequency set in accordance with a transmission gear ratio by $\omega_n$, and a Laplace operator by s, the transfer function is calculated in accordance with $$1/(s^2+2\zeta\omega_n s+\omega_n^2)$$

and a control gain K set by said feedback correction step is calculated in accordance with $$K=(\zeta'-\zeta)\cdot 2\omega_n.$$

* * * * *